(12) United States Patent
Fukui et al.

(10) Patent No.: US 11,919,128 B2
(45) Date of Patent: Mar. 5, 2024

(54) PROCESSING METHOD AND PROCESSING DEVICE FOR CERAMIC HONEYCOMB STRUCTURE

(71) Applicant: NGK INSULATORS, LTD., Nagoya (JP)

(72) Inventors: Toshihiro Fukui, Nagoya (JP); Yasunobu Tanaka, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 450 days.

(21) Appl. No.: 16/743,390

(22) Filed: Jan. 15, 2020

(65) Prior Publication Data

US 2020/0238470 A1 Jul. 30, 2020

(30) Foreign Application Priority Data

Jan. 24, 2019 (JP) .................................. 2019-010608

(51) Int. Cl.
*B24B 9/06* (2006.01)
*B24B 5/18* (2006.01)
(Continued)

(52) U.S. Cl.
CPC .................. *B24B 9/06* (2013.01); *B24B 5/18* (2013.01); *B24B 5/307* (2013.01); *B24B 5/35* (2013.01);
(Continued)

(58) Field of Classification Search
CPC . B28B 11/0818; B28B 1/08; B28B 2264/107; B28B 2305/024; B24B 5/04; B24B 5/18; B24B 5/22; B24B 19/22; B24B 19/008; B24B 27/0069; B24B 9/06; B24B 5/28; B24B 5/30; B24B 5/307;
(Continued)

(56) References Cited

U.S. PATENT DOCUMENTS 1,842,375 A * 1/1932 Einstein .................... B24B 5/28
125/11.01
1,938,757 A * 12/1933 Einstein .................... B24B 5/18
451/140
(Continued)

FOREIGN PATENT DOCUMENTS

EP 1724056 A1 * 11/2006 ............. B24B 19/22
EP 2724814 B1 * 7/2020 ......... B01D 46/2451
(Continued)

OTHER PUBLICATIONS

JP2016193486A EspaceNet Translation (Year: 2016).*
(Continued)

*Primary Examiner* — Joel D Crandall
*Assistant Examiner* — Makena S Markman
(74) *Attorney, Agent, or Firm* — BURR PATENT LAW, PLLC

(57) ABSTRACT

A method for processing a ceramic honeycomb structure, the method comprising subjecting an outer peripheral surface of the ceramic honeycomb structure to centerless grinding in an in-feed mode by bringing a rotationally driving grinding wheel into contact with the outer peripheral surface of the ceramic honeycomb structure rotationally supported by an adjusting wheel, a blade, and a press roller.

6 Claims, 1 Drawing Sheet

(51) Int. Cl.
  B24B 5/307 (2006.01)
  B24B 5/35 (2006.01)
  B24B 27/06 (2006.01)
  *B01J 35/04* (2006.01)
  *F01N 3/28* (2006.01)

(52) U.S. Cl.
  CPC .......... B24B 5/355 (2013.01); B24B 27/0658 (2013.01); *B01J 35/04* (2013.01); *F01N 3/2828* (2013.01)

(58) Field of Classification Search
  CPC ....... B24B 5/38; B24B 27/0658; B24B 41/06; B24B 41/061
  See application file for complete search history.

(56) References Cited

U.S. PATENT DOCUMENTS

| | | | | |
|---|---|---|---|---|
| 2,332,528 A | * | 10/1943 | Rauschenberger | B24B 5/307 451/397 |
| 5,487,694 A | * | 1/1996 | Deming | B24B 9/02 409/199 |
| 5,853,316 A | * | 12/1998 | Kern | B24B 5/22 451/6 |
| 7,309,277 B2 | * | 12/2007 | Nishio | F01N 3/2828 451/61 |
| 8,728,607 B2 | * | 5/2014 | Okazaki | C04B 41/5089 428/116 |
| 9,962,770 B2 | * | 5/2018 | Okazaki | B28B 11/12 |
| 10,000,031 B2 | * | 6/2018 | Elliott | B28B 11/12 |
| 2005/0025933 A1 | * | 2/2005 | Masukawa | B01J 35/04 428/116 |
| 2005/0166729 A1 | | 8/2005 | Nishio et al. | |
| 2006/0289501 A1 | | 12/2006 | Michiwaki et al. | |
| 2010/0009117 A1 | | 1/2010 | Okazaki | |
| 2016/0280937 A1 | | 9/2016 | Ono et al. | |

FOREIGN PATENT DOCUMENTS

| | | | |
|---|---|---|---|
| JP | H07-80762 A1 | | 3/1995 |
| JP | H07266205 | * | 10/1995 |
| JP | 2001138186 A | * | 5/2001 |
| JP | 2001-191240 A1 | | 7/2001 |
| JP | 2003-291054 A1 | | 10/2003 |
| JP | 2005219135 A | * | 8/2005 |
| JP | 2005224874 A | * | 8/2005 |
| JP | 2006-320806 A1 | | 11/2006 |
| JP | 2007144922 A | * | 6/2007 |
| JP | 2009227555 A | * | 10/2009 |
| JP | 2013-215822 A1 | | 10/2013 |
| JP | 2016-179930 A1 | | 10/2016 |
| JP | 6010321 B2 | * | 10/2016 |
| JP | 2016193486 A | * | 11/2016 |
| JP | 2019128124 A | * | 8/2019 |
| WO | 2008/078748 A1 | | 7/2008 |
| WO | WO-2016121785 A1 | * | 8/2016 |

OTHER PUBLICATIONS

Brittanica Definition of Friction (Year: 2018).*
JP-6010321-B2 EspaceNet Translation (Year: 2016).*
JP-2005219135-A EspaceNet Translation (Year: 2005).*
JP-2005224874-A EspaceNet Translation (Year: 2005).*
JP2019128124A EspaceNet Translation (Year: 2019).*
JP-2001138186-A EspaceNet Translation (Year: 2001).*
WO-2016121785-A1 English Translation (Year: 2016).*
JPH07266205 English Translation (Year: 1995).*
JP-2007144922-A English Translation (Year: 2007).*
JP-2009227555-A English translation (Year: 2009).*
Japanese Office Action (Application No. 2019-010608) dated Nov. 16, 2021 (with English translation).
German Office Action (Application No. 10 2020 000 252.8) dated Nov. 18, 2020 (with English translation).

* cited by examiner

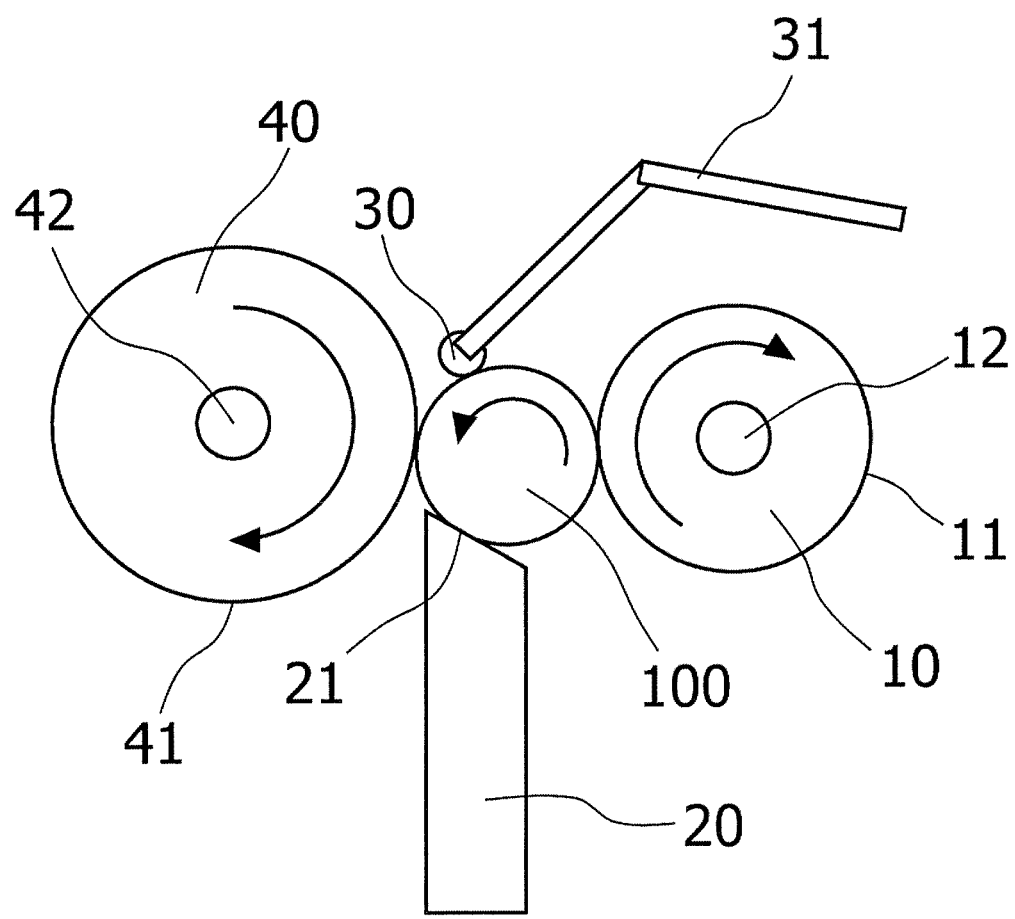

PROCESSING METHOD AND PROCESSING DEVICE FOR CERAMIC HONEYCOMB STRUCTURE

FIELD OF THE INVENTION

The present invention relates to a processing method and a processing device for ceramic honeycomb structure.

BACKGROUND OF THE INVENTION

Ceramic honeycomb structures are used in a wide range of applications, such as catalyst supports for purifying automobile exhaust gases, diesel particulate filters, and heat storage units for combustion equipment, and they require processing of an outer peripheral surface into various shapes depending on the applications. For example, a catalyst support for purifying an automobile exhaust gas or the like is housed in a metallic can body and then used, so that an outer peripheral surface of a ceramic honeycomb structure is required to be processed into a shape corresponding to the internal shape of the can body (e.g., a cylindrical shape). Further, depending on the applications, it may be required to form a convex portion or a concave portion on a part of the outer peripheral surface.

As a conventional processing method for a ceramic honeycomb structure, cylindrical grinding is generally used (for example, Patent Documents 1 and 2). In the cylindrical grinding, a work piece (ceramic honeycomb structure) is centered, and both ends of the work piece are supported and rotated to process the outer peripheral surface by a grinding machine. Therefore, it tends to obtain a ceramic honeycomb structure having higher cylindricity (roundness of the outer peripheral surface). However, the cylindrical grinding results in many cutting stocks and also requires the centering and the like, which takes a long time. Further, since the ceramic honeycomb structure has an uneven shape, it is required to process the entire outer peripheral surface. However, in the cylindrical grinding, the entire outer peripheral surface cannot be cut at once. Therefore, in the method of processing the ceramic honeycomb structure using the cylindrical grinding, a working efficiency is lower and a processing time is longer.

As other processing method of the ceramic honeycomb structure, a method using cutting means provided with a linear cutting tool is proposed (for example, Patent Document 3). However, this method also has problems similar to those of the cylindrical grinding.

On the other hand, as a processing method for a work piece, centerless grinding in an in-feed mode is known in the art, which bringing a rotationally driving grinding wheel into contact with an outer peripheral surface of a work piece rotationally supported by an adjusting wheel and a blade. This method has a smaller cutting stock and does not require centering and the like, which is suitable for processing a long work piece. Therefore, it can allow a processing time of the entire outer peripheral surface to be shortened.

CITATION LIST

Patent Literatures

Patent Document 1: Japanese Patent Application Publication No. 2001-191240A
Patent Document 2: Japanese Patent Application Publication No. 2006-320806 A
Patent Document 3: Japanese Patent Application Publication No. 2003-291054 A

SUMMARY OF THE INVENTION

The present invention provides a method for processing a ceramic honeycomb structure, the method comprising subjecting an outer peripheral surface of the ceramic honeycomb structure to centerless grinding in an in-feed mode by bringing a rotationally driving grinding wheel into contact with the outer peripheral surface of the ceramic honeycomb structure rotationally supported by an adjusting wheel, a blade, and a press roller.

Also, the present invention provides a device for processing a ceramic honeycomb structure, the device being for subjecting an outer peripheral surface of the ceramic honeycomb structure to centerless grinding in an in-feed mode, the device comprising:

an adjusting wheel, a blade and a press roller, which are capable of rotationally supporting the ceramic honeycomb structure; and a grinding wheel capable of being rotationally driven and brought into contact with the outer peripheral surface of the ceramic honeycomb structure.

According to the present invention, it is possible to provide a processing method and a processing device for a ceramic honeycomb structure, which can allow centerless grinding of the ceramic honeycomb structure in an in-feed mode.

BRIEF DESCRIPTION OF THE DRAWINGS

FIG. 1 is an explanatory view schematically showing a processing method for a ceramic honeycomb structure according to an embodiment of the present invention.

DETAILED DESCRIPTION OF THE INVENTION

When processing a ceramic honeycomb structure using a centerless grinding of the in-feed mode, there is a problem that it is difficult to rotationally support the ceramic honeycomb structure. Specifically, the ceramic honeycomb structure moves in the elevating direction or the ceramic honeycomb structure does not rotate, during rotational support by the adjusting wheel and the blade. Therefore, it has been difficult to apply the centerless grinding to the ceramic honeycomb structure.

The present invention has been made to solve the above problems. An object of the present invention is to provide a processing method and a processing device for a ceramic honeycomb structure, which can allow centerless grinding of the ceramic honeycomb structure in an in-feed mode.

As a result of intensive studies to solve the above problems, the present inventors have found that by supporting a ceramic honeycomb structure at three points of an adjusting wheel, a blade and a press roller, the rotational support of the ceramic honeycomb structure can be stably carried out, and have completed the present invention.

Hereinafter, embodiments according to the present invention will be specifically described with reference to the drawings. It is to understand that the present invention is not limited to the following embodiments, and various modifications and improvements, which will be within the scope of the present invention, may be made based on ordinary knowledge of a person skilled in the art, without departing from the spirit of the present invention.

FIG. 1 is an explanatory view schematically showing a processing method for a ceramic honeycomb structure according to an embodiment of the present invention.

As shown in FIG. 1, a method for processing a ceramic honeycomb structure according to an embodiment of the present invention subjects an outer peripheral surface of a ceramic honeycomb structure 100 to centerless grinding in an in-feed mode by bringing a rotationally driving grinding wheel 40 into contact with the outer peripheral surface of the ceramic honeycomb structure 100 rotationally supported by an adjusting wheel 10, a blade 20, and a press roller 30.

As used herein, the "ceramic honeycomb structure 100" refers to a honeycomb-shaped ceramic structure having grid-shaped partition walls that define a plurality of cells which form fluid flow paths extending from one end face to other end face.

The ceramic honeycomb structure 100 can be obtained by adding a binder, a surfactant, water, and the like to a ceramic raw material, and mixing and kneading it to provide a green body, which is then extruded to prepare a ceramic honeycomb formed body, which is dried with microwaves, hot air, or the like, and then fired, although not particularly limited.

Non-limiting examples of the ceramic raw material include silicon carbide, silicon nitride, metallic silicon, cordierite, alumina, mullite, zirconia, zirconium phosphate, aluminum titanate, and titania.

The shape of the ceramic honeycomb structure 100 is not particularly limited as long as it can be rotationally supported by the adjusting wheel 10, the blade 20 and the press roller 30. It is generally cylindrical.

A diameter φ (a diameter of a cross section perpendicular to a cell extending direction) of the ceramic honeycomb structure 100 may be appropriately set according to a size of a processing device to be used and is not particularly limited. It is preferably from 90 to 185 mm, and more preferably from 110 to 170 mm.

The above method for processing the ceramic honeycomb structure 100 can be carried out using a processing device for a ceramic honeycomb structure including: the adjusting wheel 10, the blade 20, and the press roller 30 which can rotationally support the ceramic honeycomb structure 100; and a grinding wheel 40 that can be rotationally driven and can be brought into contact with the outer peripheral surface of the ceramic honeycomb structure 100.

The adjusting wheel 10 has a function of rotationally supporting the outer peripheral surface of the ceramic honeycomb structure 100, and a rotation support surface 11 (an outer peripheral surface) of the adjusting wheel 10 has a profile corresponds to a finish shape of the outer peripheral surface of the ceramic honeycomb structure 100. A specific shape of the adjusting wheel 10 is not particularly limited as long as the adjusting wheel 10 includes the rotation support surface 11.

The adjusting wheel 10 preferably has a surface roughness Ra of from 10 to 30 μm, and more preferably from 15 to 25 μm. The surface roughness Ra of the adjusting wheel 10 of 10 μm or more can lead to stable rotational support of the outer peripheral surface of the ceramic honeycomb structure 100. Further, the surface roughness Ra of the adjusting wheel 10 of 30 μm or less can prevent the outer peripheral surface of the ceramic honeycomb structure 100 from being roughened after processing.

The adjusting wheel 10 preferably has a diameter of from 200 to 350 mm, and more preferably from 250 to 290 mm. The diameter of the adjusting wheel 10 of 200 mm or more can lead to stable rotational support of the outer peripheral surface of the ceramic honeycomb structure 100. Further, the diameter of the adjusting wheel 10 of 350 mm or less can avoid an increase in the size of the processing device.

The adjusting wheel 10 is detachably mounted and fixed to an adjusting axle 12 of the adjusting wheel 10. The adjusting axle 12 is rotationally supported on an adjusting wheel table (not shown), and also drivingly connected to a power source such as a drive motor via a power transmitting means such as a power transmission belt and a gear mechanism.

The blade 20 has a function of supporting the outer peripheral surface of the ceramic honeycomb structure 100 together with the adjusting wheel 10. The blade 20 is disposed on the adjusting wheel table as in the adjusting wheel 10, extends parallel to the axis of the adjusting wheel 10 and the grinding wheel 40, and has a support surface 21 in which an upper end surface of the blade 20 is downwardly inclined toward the adjusting wheel 10 side.

The size of the blade 20 is not particularly limited as long as it is within a range where the outer peripheral surface of the ceramic honeycomb structure 100 can be supported by the support surface 21.

The press roller 30 has a function of supporting the outer peripheral surface of the ceramic honeycomb structure 100 together with the adjusting wheel 10 and the blade 20. When the press roller 30 is not provided, i.e., when the ceramic honeycomb structure 100 is rotationally supported at two points of the adjusting wheel 10 and the blade 20, the ceramic honeycomb structure 100 may move in the elevating direction, or the ceramic honeycomb structure 100 may not be rotated.

It is preferable that the press roller 30 is provided at a position that suppresses movement of the rotating ceramic honeycomb structure 100 in the elevating direction. The providing of the press roller 30 at such a position, the ceramic honeycomb structure 100 can allow stable rotational support at the three points of the adjusting wheel 10, the blade 20, and the press roller 30.

By providing the press roller 30 on an upper side of the rotating ceramic honeycomb structure 100, for example, the movement of the rotating ceramic honeycomb structure 100 in the elevating direction can be suppressed by the weight of the press roller 30.

The size of the press roller 30 is not particularly limited as long as the movement of the rotating ceramic honeycomb structure 100 in the elevating direction can be suppressed.

The press roller 30 is provided so as to be movable in the elevating/lower direction by an arm 31 or the like, and the arm 31 is connected to an adjusting cart or the like.

The grinding wheel 40 has a function of grinding the outer peripheral surface of the ceramic honeycomb structure 100, and has a profile in which a grinding wheel surface 41 (an outer peripheral surface) of the grinding wheel 41 corresponds to a finish shape of the outer peripheral surface of the ceramic honeycomb structure 100. A specific shape of the grinding wheel 40 is not particularly limited as long as the grinding wheel surface 41 is provided.

The grinding wheel 40 preferably has a diameter of from 300 to 500 mm, and more preferably from 380 to 420 mm. The diameter of the grinding wheel 40 of 300 mm or more can allow the outer peripheral surface of the ceramic honeycomb structure 100 to be stably ground. The diameter of the grinding wheel 40 of 500 mm or less can avoid an increase in the size of the processing device.

The grinding wheel 40 is detachably mounted and fixed to a grinding wheel axle 42. The grinding wheel axle 42 is rotationally supported on a grinding wheel table (not shown), and drivingly connected to a power source such as a drive motor via a power transmitting means such as a power transmission belt and a gear mechanism.

When carrying out the centerless grinding in the in-feed mode using the processing device for the ceramic honeycomb structure having the above configuration, first, the ceramic honeycomb structure 100 is rotationally supported by the adjusting wheel 10, the blade 20, and the press roller 30. The outer peripheral surface of the ceramic honeycomb structure 100 is then ground by bringing the grind wheel 40 that is rotationally driven into contact with the outer peripheral surface of the ceramic honeycomb structure 100.

In this case, a rotational speed of the adjusting wheel 10 is preferably from 0.2 to 3 m/sec, and more preferably from 0.5 to 2.5 m/sec. The rotational speed of the adjusting wheel 10 of 0.2 m/sec or more can allow the work piece (the ceramic honeycomb structure 100) to be satisfactorily processed. The rotational speed of the adjusting wheel 10 of 3 m/sec or less can prevent any damage due to the rotation of the work piece.

Further, the rotational speed of the grinding wheel 40 is preferably from 10 to 32 m/sec, and more preferably from 12 to 30 m/sec. The rotational speed of the grinding wheel 40 of 10 m/sec or more can allow the work piece to be satisfactorily processed. Furthermore, the rotational speed of the grinding wheel 40 of 32 m/sec or less can suppress the surface peeling of the grinding wheel.

The use of the method and device for processing the ceramic honeycomb structure according to the present embodiment can allow centerless grinding of the ceramic honeycomb structure 100 in the in-feed mode. Therefore, when compared with the conventional processing method (for example, cylindrical grinding or the like) of the ceramic honeycomb structure, the method of the present invention can shorten the processing time and reduce the cutting stock. Further, the use of the method and device for processing the ceramic honeycomb structure according to the present embodiment can improve dimensional accuracy.

EXAMPLES

Hereinafter, the present invention will be more specifically described with reference to Examples, but the present invention is not limited to these Examples.
(Preparation of Ceramic Honeycomb Structure)

Silicon carbide powder and silicon powder were used as ceramic raw materials, to which a binder, a surfactant, and water were added, mixed and kneaded to obtain a green body. The green body was then extruded, dried with microwaves and hot air, and then fired to obtain a cylindrical ceramic honeycomb structure having a diameter of 165 mm.
(Rotational Support Evaluation of Ceramic Honeycomb Structure)

In order to carry out centerless grinding in an in-feed mode using the processing device for the ceramic honeycomb structure as shown in FIG. 1, a surface roughness Ra of the adjusting wheel 10 was changed from 2 to 30, and whether or not the ceramic honeycomb structure 100 could be rotationally supported by the adjusting wheel 10, the blade 20, and the press roller 30 was evaluated. In the processing device, the diameter of the adjusting wheel 10 was 270 mm, the diameter of the grinding wheel 40 was 405 mm, the rotational speed of the adjusting wheel 10 was 0.7 m/sec, and the rotational speed of the grinding wheel 40 was 32 m/sec. The results are shown in Table 1. In Table 1, a sample that could be rotationally supported was indicated by ○, and sample that could not be rotationally supported was indicated by x.

TABLE 1

| | Surface Roughness Ra (μm) | | | | | |
|---|---|---|---|---|---|---|
| | 2 | 4 | 6 | 10 | 20 | 30 |
| Rotational Support | x | x | x | ○ | ○ | ○ |

As shown in Table 1, it was found that when the surface roughness Ra of the adjusting wheel 10 was from 10 to 30 μm, the ceramic honeycomb structure 100 could be rotationally supported. It should be noted that the adjustment of the diameter and rotational speed of the adjusting wheel 10, as well as the adjustment of the diameter and rotational speed of the grinding wheel 40 may allow the ceramic honeycomb structure 100 to be rotationally supported even if the surface roughness Ra of the adjusting wheel 10 is less than 10 μm.
(Grinding of Ceramic Honeycomb Structure)

The outer peripheral surface of the ceramic honeycomb structure 100 was subjected to centerless grinding in an in-feed mode using the processing device as shown in FIG. 1 with a surface roughness Ra of the adjusting wheel 10 of 20 μm, under the same conditions as those described above.

For comparison, the outer peripheral surface of the ceramic honeycomb structure 100 was ground using cylindrical grinding.

The cylindricity of the processed ceramic honeycomb structure 100 was evaluated. The cylindricity (mm) was calculated by measuring the maximum diameter and the minimum diameter with a laser displacement meter at arbitrary five points including both end faces in the axial direction (the cell extending direction) and determining its difference. The results are shown in Table 2.

TABLE 2

| | Cylindricity (mm) | | | | | |
|---|---|---|---|---|---|---|
| Processing Method | 1 | 2 | 3 | 4 | 5 | Average |
| Cylindrical Grinding | 0.49 | 0.55 | 0.50 | 0.53 | 0.44 | 0.50 |
| Centerless Grinding | 0.13 | 0.11 | 0.12 | 0.12 | 0.11 | 0.12 |

As shown in Table 2, it was found that the centerless grinding of the in-feed mode had better cylindricity than that of the cylindrical grinding.

As can be seen from the above results, according to the method and the device for processing the ceramic honeycomb structure according to the present embodiment, the ceramic honeycomb structure can be subjected to centerless grinding in the in-feed mode.

INDUSTRIAL APPLICABILITY

The processing method and processing device for the ceramic honeycomb structure according to the present embodiment can be used in a wide range of applications such as catalyst supports for purifying automobile exhaust gases, filters for removing diesel particulates, and heat storage bodies for combustion devices.

DESCRIPTION OF REFERENCE NUMERALS 10 adjusting wheel
11 rotation support surface
12 adjusting axle
20 blade 21 support surface
30 press roller
31 arm
40 grinding wheel
41 grinding wheel surface
42 grinding wheel axle
100 ceramic honeycomb structure

The invention claimed is:

1. A method for processing a ceramic honeycomb structure, the method comprising: subjecting an outer peripheral surface of the ceramic honeycomb structure having a center axis to centerless grinding in an in-feed mode by bringing a rotationally driving grinding wheel into contact with the outer peripheral surface of the ceramic honeycomb structure rotationally supported by an adjusting wheel, a blade having a support surface, and a press roller;
- wherein the grinding wheel and the adjusting wheel each have a cylindrical shape;
- wherein an axle of the grinding wheel and an axle of the adjusting wheel each have a rotational axis that is parallel with the center axis of the ceramic honeycomb structure; and
- wherein the entire press a is disposed directly above the support surface of the blade.

2. The method for processing the ceramic honeycomb structure according to claim 1, wherein the press roller is provided at a position that suppresses movement of the rotating ceramic honeycomb structure in an elevating direction.

3. The method for processing the ceramic honeycomb structure according to claim 1, wherein the adjusting wheel has a surface roughness Ra of from 10 to 30 μm.

4. The method for processing the ceramic honeycomb structure according to claim 1, wherein the adjusting wheel has a rotational speed of from 0.2 to 3 m/sec.

5. The method for processing the ceramic honeycomb structure according to claim 1, wherein the grinding wheel has a rotational speed of from 10 to 32 m/sec.

6. A device for processing a ceramic honeycomb structure, the device being for subjecting an outer peripheral surface of the ceramic honeycomb structure to centerless grinding in an in-feed mode, the device comprising:
- an adjusting wheel, a blade having a support surface and a press roller, which are capable of rotationally supporting the ceramic honeycomb structure; and
- a grinding wheel capable of being rotationally driven and brought into contact with the outer peripheral surface of the ceramic honeycomb structure;
- wherein the grinding wheel and the adjusting wheel each have a cylindrical shape;
- wherein an axle of the grinding wheel and an axle of the adjusting wheel each have a rotational axis that is parallel with the center axis of the ceramic honeycomb structure; and
- wherein the entire press roller is disposed directly above the support surface of the blade.

* * * * *